US012311390B2

(12) United States Patent
Echeverria

(10) Patent No.: US 12,311,390 B2
(45) Date of Patent: May 27, 2025

(54) SMOKE GENERATOR WITH DEFLECTOR

(71) Applicant: Verisure Sàrl, Versoix (CH)

(72) Inventor: Jon Noble Echeverria, Madrid (ES)

(73) Assignee: Verisure Sàrl, Versoix (CH)

( * ) Notice: Subject to any disclaimer, the term of this patent is extended or adjusted under 35 U.S.C. 154(b) by 0 days.

(21) Appl. No.: 18/214,170

(22) Filed: Jun. 26, 2023

(65) Prior Publication Data

US 2023/0330687 A1 Oct. 19, 2023

Related U.S. Application Data

(63) Continuation of application No. 17/713,992, filed on Apr. 5, 2022, now Pat. No. 11,724,269, which is a continuation of application No. 16/397,081, filed on Apr. 29, 2019, now Pat. No. 11,318,485, which is a continuation of application No. 15/859,874, filed on Jan. 2, 2018, now Pat. No. 11,045,820.

(30) Foreign Application Priority Data

Nov. 4, 2016 (EP) .................................... 16197296

(51) Int. Cl.
*B05B 1/26* (2006.01)
*F41H 9/08* (2006.01)
*G08B 15/02* (2006.01)

(52) U.S. Cl.
CPC ............... *B05B 1/262* (2013.01); *F41H 9/08* (2013.01); *G08B 15/02* (2013.01)

(58) Field of Classification Search
CPC ............ B05B 1/262; F41H 9/08; G08B 15/02
See application file for complete search history.

(56) References Cited

U.S. PATENT DOCUMENTS 1,715,278 A 5/1929 Chantemerle
1,763,581 A 6/1930 Dalton
2,065,635 A 12/1936 Weinert
(Continued)

FOREIGN PATENT DOCUMENTS

DE 1101248 B 3/1961
EP 0623906 B1 11/1999
(Continued)

OTHER PUBLICATIONS

FR-2646944 A1; Mathis, "Portable Alarm And Smoke Generator System For Suitcases", 1990. (Year: 1990).*
(Continued)

*Primary Examiner* — Son T Le
*Assistant Examiner* — Tania Courson
(74) *Attorney, Agent, or Firm* — Tucker Ellis LLP

(57) ABSTRACT

A smoke generator for anti-burglar purposes includes a canister holding means for holding a canister for chemicals to be used to generate smoke wherein the smoke generator further includes a smoke deflector arranged below the position of the canister for even distribution of generated smoke, and wherein the smoke deflector have a smoke deflector cavity of sector shape. The smoke generator is provided with a cartridge for the canister to ease replacement of used or expired canister. The smoke deflector is provided with a residual collector to prevent residuals and debris from littering the room where the smoke generator is used.

12 Claims, 7 Drawing Sheets

(56) References Cited

U.S. PATENT DOCUMENTS

| | | | | |
|---|---|---|---|---|
| 2,311,199 | A | 2/1943 | Astradsson | |
| 2,581,353 | A | 1/1952 | Bonvillian et al. | |
| 2,611,311 | A | 9/1952 | Irwin | |
| 2,697,427 | A | 12/1954 | Rigali | |
| 2,809,606 | A | 10/1957 | Bates | |
| 3,003,279 | A | 10/1961 | Bonanno | |
| 3,062,176 | A | 11/1962 | Williams | |
| 3,120,183 | A | 2/1964 | Wheelwright et al. | |
| 3,520,275 | A | 7/1970 | Heinz | |
| 3,526,202 | A | 9/1970 | Graulich et al. | |
| 3,759,216 | A | 9/1973 | Sanders et al. | |
| 3,828,341 | A * | 8/1974 | Carter, Jr. | G08B 13/24 340/691.7 |
| 4,449,474 | A | 5/1984 | Mariol | |
| 4,547,656 | A * | 10/1985 | Swiatosz | H05B 3/46 392/397 |
| 5,182,541 | A | 1/1993 | Bajorek et al. | |
| 5,300,260 | A | 4/1994 | Keshet | |
| 5,320,536 | A | 6/1994 | Rogers | |
| 5,328,375 | A | 7/1994 | Rogers | |
| 5,335,559 | A | 8/1994 | Rogers | |
| 5,394,139 | A | 2/1995 | Dards | |
| 5,398,016 | A | 3/1995 | Burayez | |
| 5,589,814 | A * | 12/1996 | Smith, Jr. | B60R 25/00 116/45 |
| 5,734,325 | A * | 3/1998 | Johnson | G08B 15/02 340/569 |
| 5,870,524 | A | 2/1999 | Swiatosz | |
| 6,087,935 | A * | 7/2000 | Berner | G08B 15/02 340/529 |
| 6,094,135 | A | 7/2000 | Sugimoto | |
| 6,546,874 | B2 | 4/2003 | Vasel | |
| 6,814,024 | B2 | 11/2004 | Lazecki | |
| 7,194,960 | B2 | 3/2007 | Vasel | |
| 7,578,225 | B2 | 8/2009 | Bosch | |
| 7,872,585 | B2 | 1/2011 | Scully | |
| 8,006,916 | B2 | 8/2011 | Metcalf et al. | |
| 8,757,443 | B2 | 6/2014 | Pelfrey | |
| 8,881,999 | B2 | 11/2014 | Blaylock et al. | |
| 8,925,478 | B2 | 1/2015 | Graber | |
| 9,482,496 | B1 * | 11/2016 | Rocchi | F41H 9/04 |
| 9,739,796 | B2 | 8/2017 | Ferrara, Jr. | |
| 9,779,598 | B2 * | 10/2017 | DiPoala | G08B 15/02 |
| 10,139,101 | B2 | 11/2018 | Pires | |
| 10,145,658 | B2 | 12/2018 | Mimura | |
| 10,332,059 | B2 * | 6/2019 | Matsuoka | G08B 25/008 |
| 10,638,768 | B2 | 5/2020 | Flood | |
| 11,045,820 | B2 | 6/2021 | Echeverria | |
| 11,098,984 | B2 | 8/2021 | Echeverria | |
| 11,318,485 | B2 | 5/2022 | Echeverria | |
| 2003/0145851 | A1 * | 8/2003 | Johnson | B64D 13/00 128/203.26 |
| 2006/0202365 | A1 | 9/2006 | Cluchey | |
| 2009/0212947 | A1 * | 8/2009 | Scully | G08B 15/02 340/541 |
| 2014/0306818 | A1 * | 10/2014 | Batchelder | G08B 15/02 340/501 |
| 2014/0318557 | A1 | 10/2014 | Bremer | |
| 2015/0124087 | A1 * | 5/2015 | Jones, Jr. | G08B 15/02 348/143 |
| 2018/0297046 | A1 | 10/2018 | Jordan | |

FOREIGN PATENT DOCUMENTS

| | | | |
|---|---|---|---|
| FR | 2600449 | A1 * | 6/1987 |
| JP | 2003208672 | A | 7/2003 |
| JP | 2004178224 | A | 6/2004 |
| JP | 2015043143 | A | 3/2015 |
| WO | 9801839 | A1 | 1/1998 |
| WO | 2015056821 | A1 | 4/2015 |

OTHER PUBLICATIONS

DE-60207349 T2; Saiz, “An Interactive Method, Apparatus And System For Controlling A Smoke-producing Intrusion Prevention Device”, 2006. (Year: 2006).*

International Search Report and Written Opinion from corresponding International Application No. PCT/IB2017/058211, mailed Jul. 9, 2018.

European Office Action from corresponding European Application No. 19175090.0, mailed on May 3, 2022, 10 pages.

Notice of Allowance and Allowed Claims from corresponding Australian Application No. 2022202186; dated Apr. 12, 2023; 8 pages.

Office Action from corresponding Israel Application No. 266416, dated Feb. 17, 2021; 4 pages.

Office Action from corresponding Chile Application No. 202103087, dated Mar. 4, 2023; 24 pages with translation.

Office Action from corresponding Brazil Application No. BR112019009076-2; dated Sep. 9, 2022; 8 pages with translation.

* cited by examiner

SMOKE GENERATOR WITH DEFLECTOR

RELATED APPLICATION DATA

This application is a continuation of U.S. patent application Ser. No. 17/713,992, filed Apr. 5, 2022, which is a continuation of U.S. patent application Ser. No. 16/397,081, filed Apr. 29, 2019, now U.S. Pat. No. 11,318,485, dated May 3, 2022, which is a continuation of U.S. patent application Ser. No. 15/859,874, filed Jan. 2, 2018, now U.S. Pat. No. 11,045,820, dated Jun. 29, 2021, and claims the benefit of European Patent Application No. 16197296.3, filed Nov. 4, 2016, the disclosures of which are incorporated herein by reference in their entireties.

TECHNICAL FIELD

The present invention relates to the field of smoke generators. In particular the invention relates to smoke generators for home or business alarm systems. In particular it relates to smoke generators with smoke deflectors for evenly distributing, in a room, smoke generated by a chemical process.

PRIOR ART

One example of such a smoke generator is found in EP0623906B1 which discloses a burglar-proofing system and theft proofing apparatus.

SUMMARY OF THE INVENTION

The smoke generator and smoke deflector of the invention is intended to generate and distribute smoke in a room where a break-in or other similar unauthorised access to a room or building is taking place in order to subdue the amount of harm caused by the intruder by impairing his or her vision and maybe also his or her breathing. The inventors have realised that smoke, if not particularly guided, tend to distribute unevenly in a room, and therefore may provide areas of less dense smoke providing a burglar with a possibility to continue his or her unauthorised activity in spite of alarm sounding and smoke being deployed. There is also a need for a small and compact smoke generator and smoke deflector that are easily manufactured and assembled. Further there is a need to be able to easily replace expendables, such as smoke pyrotechnic canister, and batteries.

The present invention provides a smoke generator and a deflector for a smoke generator and a residual collector for the smoke deflector for collecting debris which may be formed during the chemical process of smoke generation. There is also provided means for easily exchanging a pyrotechnic canister.

The smoke deflector of the present invention comprises at an upper surface a flange defining an inlet opening allowing smoke from a bottom portion of a pyrotechnic smoke canister to enter an inside of the smoke deflector. The upper flange is part of a smoke deflector upper part. The smoke deflector upper part is attached to a smoke deflector lower part together defining a smoke deflector cavity. The smoke deflector cavity has an inlet opening as described above, and an elongated outlet opening, horizontally arranged, for distributing the smoke into the room. Further, the smoke deflector cavity is arranged to have a shape generally resembling a cylindrical sector having a relatively small thickness. The cylindrical sector has an upper surface, a lower surface, two side surfaces, a base surface, and an apex.

The apex may end in a pointed shape or form a cut shape. Preferably, the upper and lower surfaces are arranged to slant downwards from the apex to the base at an angle of 10 to 15 degrees relative to the horizontal plane.

The inlet opening can be viewed as being arranged at the upper surface near the apex. The outlet opening can be viewed as being arranged at the base surface, corresponding to a major portion of, or the entire base surface.

In detail, the upper surface of the lower part of the smoke deflector, forming the floor of the smoke deflector cavity, may be flat or formed to be slightly dome-shaped. The dome shape may be of one of three particular shapes or of a combination thereof. A first particular dome shape entails that a floor upper portion, near the apex is slanting a first number of degrees relative to the horizontal plane, and a floor lower portion is slanting a second number of degrees relative to the horizontal plane, wherein the second number of degrees are greater than the first number of degrees.

A second particular dome shape entails that the upper surface of the lower part of the smoke deflector, forming the floor of the smoke deflector cavity is shaped like a portion of a cone, wherein imaginary lines starting at an apex of the cone, imaginary or not, and ending at the periphery of the upper surface, all are assuming an angle of 75 to 80 degrees relative to a vertical line through the apex of the cone, imaginary or not.

The flat shape is a plane shape, equal to a plane slanting 10 to 15 degrees relative to a horizontal plane, with its highest point at the apex and its lowest points located at lower rim of orifice defining the outlet opening.

The floor of the smoke detector cavity may in a preferred embodiment be provided with a residual collector for collecting residual debris that may be formed by the chemical process of producing smoke.

The residual collector is preferably arranged as a groove at the floor of the smoke deflector cavity, close to where it forms the elongated outlet orifice, or even forming the lower portion of that outlet orifice.

The smoke deflector is easily manufactured by e.g. injection moulding or die-casting of an upper part and a lower part which is assembled to form the ready smoke deflector. The structure defining the residual collector groove can easily be formed as an integral part of the lower part by e.g. injection moulding or die-casting.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
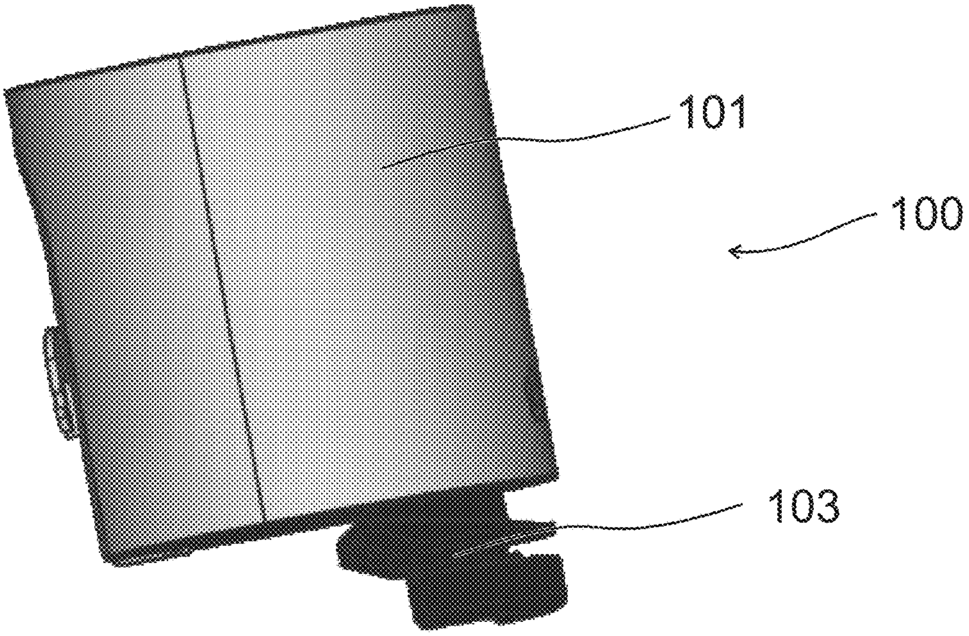
FIG. 1A shows a side view of a smoke generator.

FIG. 1A shows a side view of a smoke generator 100 for generating smoke upon activation in order to fill a space such as a room with smoke to prevent burglary or other non-desired activity. The smoke generator comprises an upper part 1,101 and a smoke deflector 103 arranged to be connected to the upper part to allow smoke to flow from a smoke canister housed in the upper part into the smoke deflector 103.

Figure 1B:
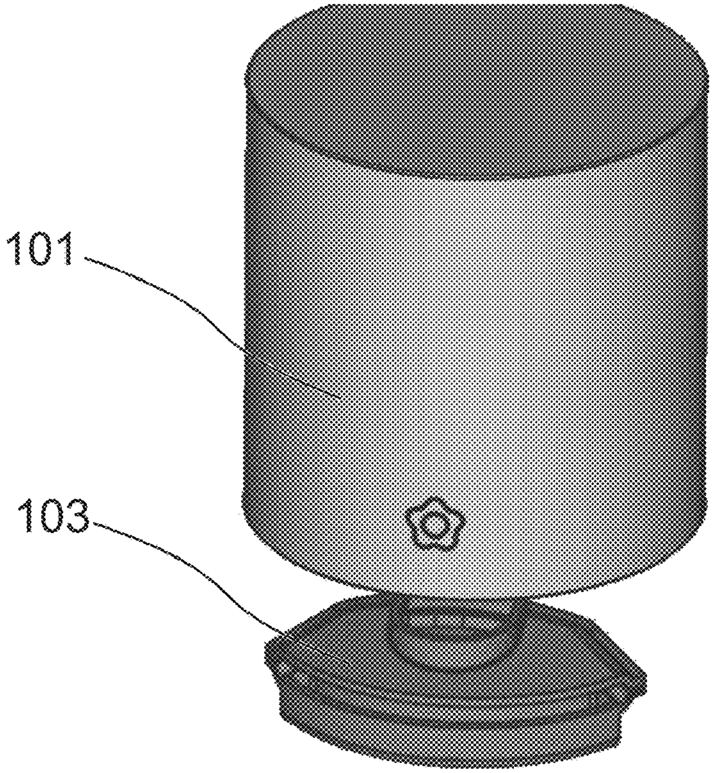
FIG. 1B shows a front/upper view of a smoke generator with a smoke deflector separated from the rest of the smoke generator.

FIG. 1B shows a front/upper view of a smoke generator with the smoke deflector 103 separated from the upper part 1, 101.

Figure 2:
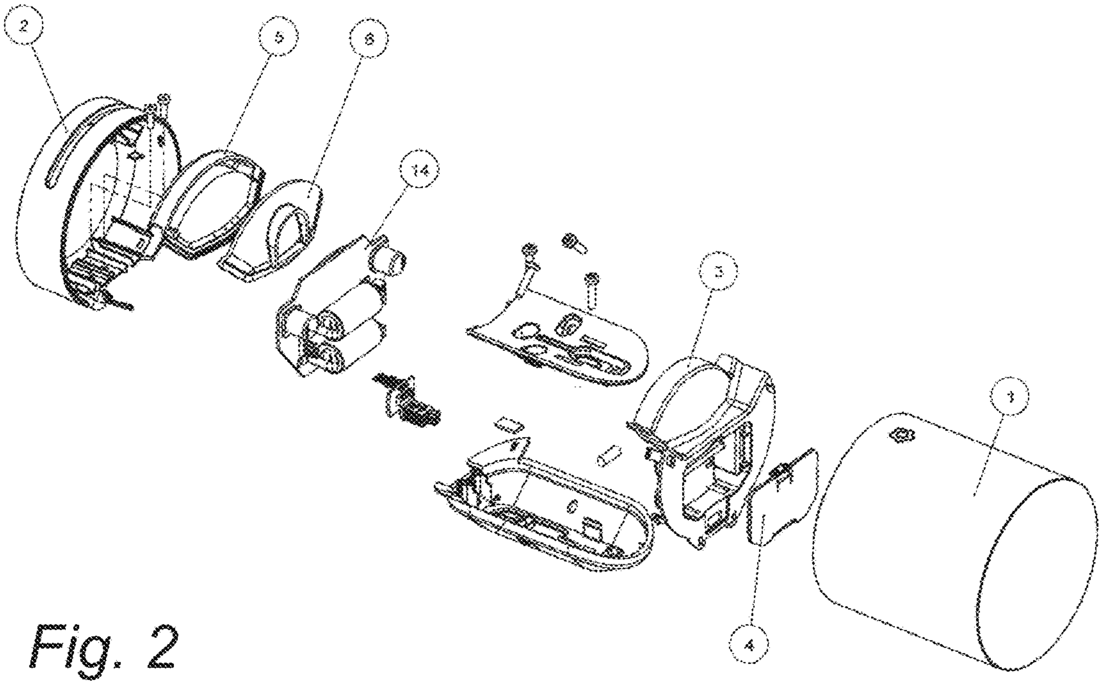
FIG. 2 shows an exploded perspective view of a smoke generator.

FIG. 2 shows an exploded perspective view of a smoke generator. The smoke generator comprises an upper part 1 and a lower part assembly comprising a battery lid 4, a compartment divider frame 3 for defining a smoke deflector compartment and a battery compartment, an electronics unit 14, and a smoke deflector 5,6 comprising a smoke deflector upper part and a smoke deflector lower part. Further the lower part assembly comprises a smoke generator lower part outer casing 2 for shape, protection and structural stability.

Figure 3:
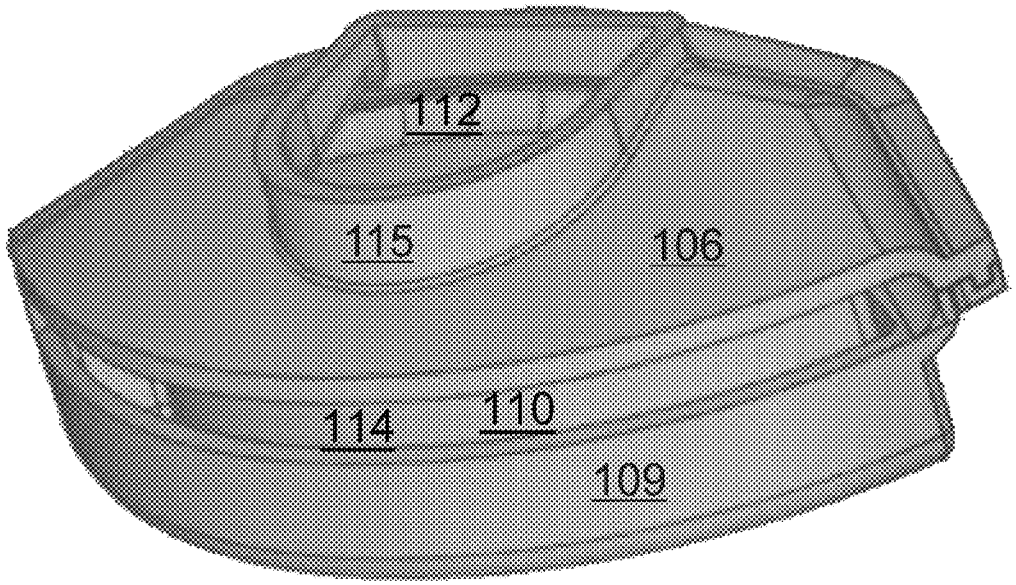
FIG. 3 shows a perspective view of a smoke deflector for a smoke generator.

FIG. 3 shows a perspective view of the smoke deflector 103 for the smoke generator. The smoke deflector 103 comprises at an upper surface a flange 115 defining an inlet 112 (also referred to as inlet opening) allowing smoke from a bottom portion of a pyrotechnic smoke canister to enter an inside of the smoke deflector. The flange 115 is part of a smoke deflector upper part 106. The flange 115 simultaneously constitutes connection means and conduit means for smoke streaming from the pyrotechnic canister. The smoke deflector upper part 106 is attached to a smoke deflector lower part 109 together defining a smoke deflector cavity. The smoke deflector cavity is provided with an inlet opening as described above, and an elongated, preferably curved, outlet opening 114 to form an emission port 110. The upper and lower parts are shaped to define the smoke deflector cavity to have a shape generally resembling a cylindrical sector having a relatively small thickness. The cylindrical sector has an upper surface, a lower surface, two side surfaces, a base surface, and an apex. The apex may end in a pointed shape or form a cut shape. Preferably, the upper and lower surfaces are arranged to slant downwards in the direction of smoke from the apex to the base at an angle of 10 to 15 degrees relative to the horizontal plane. Thus, smoke gases are forced to change direction about 75 to 85 degrees from vertical direction, and at the same time spreading in the plane slanting 10 to 15 degrees relative to the horizontal plane, guided by the deflector. The inlet opening can be viewed as being arranged at the upper surface near the apex. The outlet opening can be viewed as being arranged at the base surface, corresponding to a major portion of, or the entire base surface.

The smoke deflector cavity is preferable extending both in front of the inlet opening and at the left and the right sides of the virtual extension of the inlet opening to form a right supporting volume, and a left supporting volume extending to the left and right respectively beyond a virtual line extending from a defining edge of inlet opening to a defining edge of outlet opening.

Figure 4A:
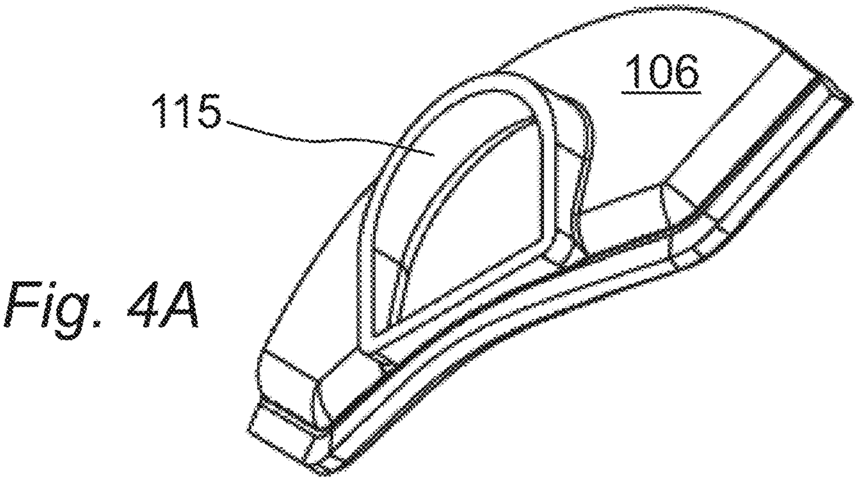
FIG. 4A shows a perspective view of an upper part of the smoke deflector of FIG. 2.
Figure 4B:
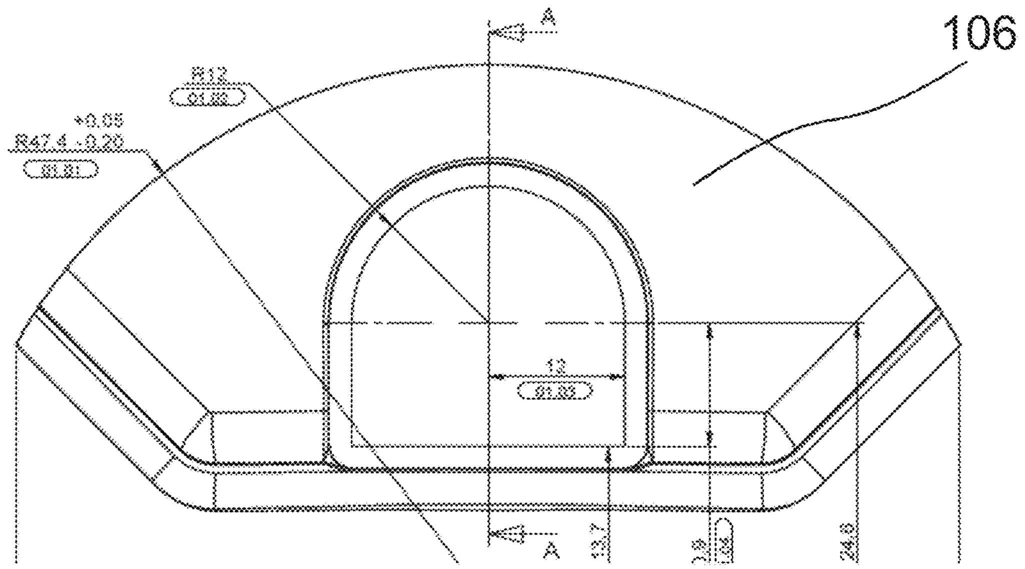
FIG. 4B shows a view from above of the smoke deflector upper part of FIG. 4A.
Figure 4C:
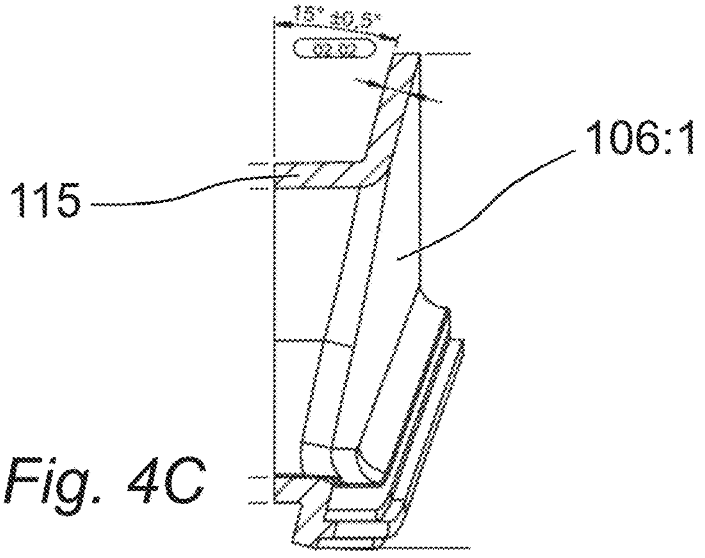
FIG. 4C shows a cross sectional view of the smoke deflector upper part of FIG. 4B.

FIG. 4A shows a perspective view of an upper part of the smoke deflector of FIG. 3. FIG. 4B shows a view from above of the smoke deflector upper part of FIG. 4A. It can be seen that the shape as seen from the above is a circular sector shape were a sector centre portion is cut off. It can be seen that the flange defining the inlet opening is arranged near that cut. FIG. 4C shows a cross sectional view of the smoke deflector upper part of FIG. 4B.

Figure 5A:
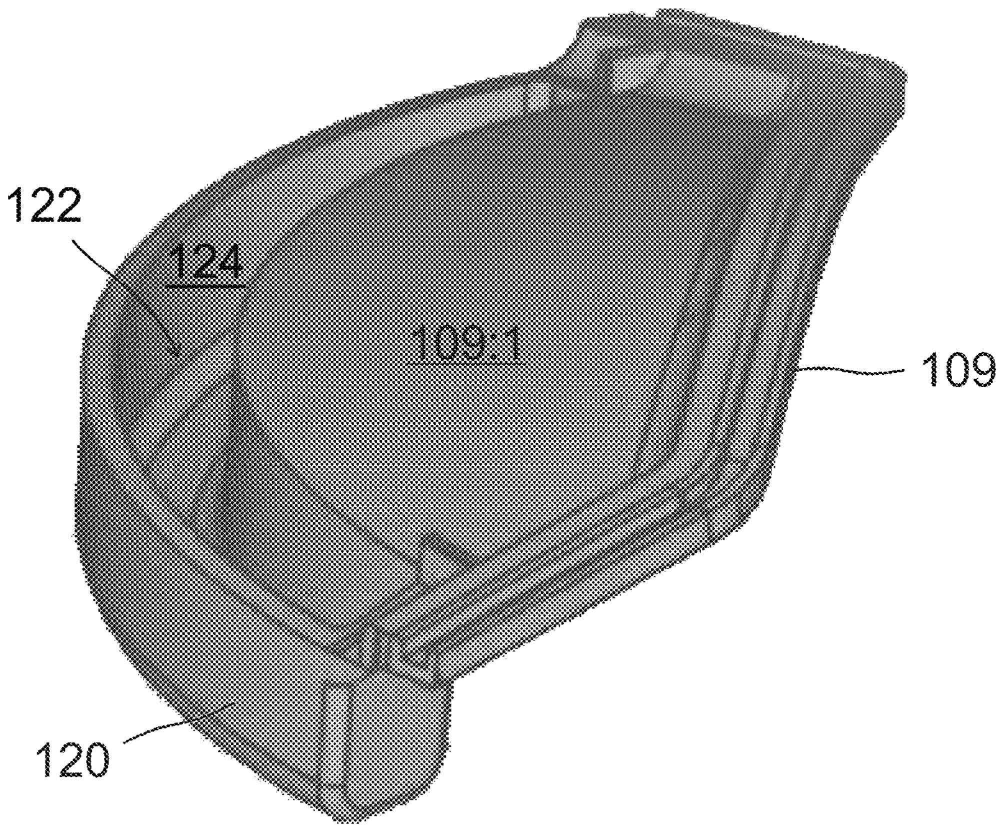
FIG. 5A shows a perspective view of a smoke deflector lower part.

FIG. 5A shows a perspective view of a smoke deflector lower part. The upper surface of the lower part of the smoke deflector, forming the floor of the smoke deflector cavity, may be flat or formed to be slightly dome-shaped. The dome shape may be of one of three particular shapes or of a combination thereof. A first particular dome shape entails that a floor upper portion, near the apex, is slanting a first number of degrees relative to the horizontal plane, and a floor lower portion, near the outlet opening, is slanting a second number of degrees relative to the horizontal plane, wherein the second number of degrees are greater than the first number of degrees.

Figure 5B:
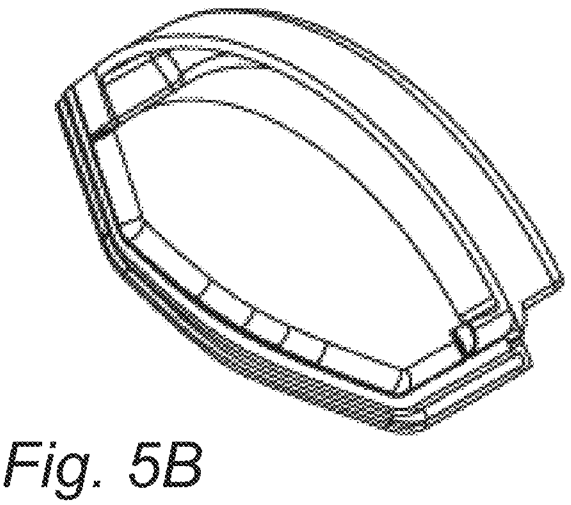
FIG. 5B shows another perspective view of the smoke deflector lower part of FIG. 5A.

FIG. 5B shows another perspective view of the smoke deflector lower part of FIG. 5A. A second particular dome shape entails that the upper surface of the lower part of the smoke deflector, forming the floor of the smoke deflector cavity is shaped like a portion of a cone, wherein imaginary lines starting at an apex of the cone, imaginary or not, and ending at the periphery of the upper surface, all are assuming an angle of 75 to 80 degrees relative to a vertical line through the apex of the cone, imaginary or not. The flat shape is a plane shape, equal to a plane slanting 10 to 15 degrees relative to a horizontal plane, with its highest point at the apex and its lowest points located at lower rim of orifice defining the outlet opening.

Figure 6A:
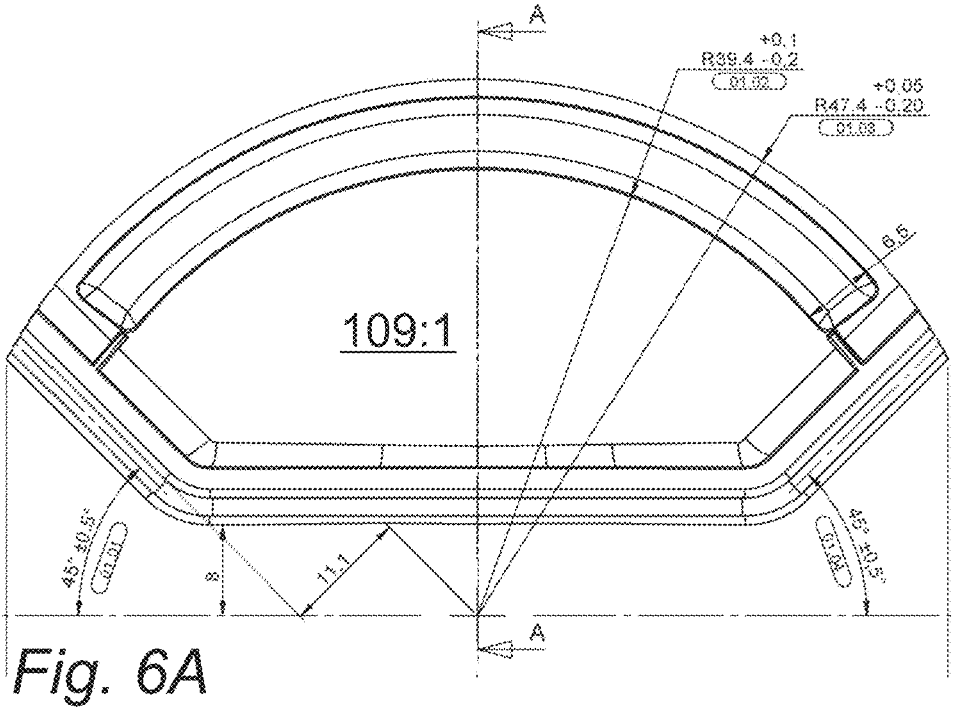
FIGS. 6A, 6B, 6C show further views of the lower part of the smoke deflector analogous to FIGS. 4A, 4B, 4C.
Figure 6B:
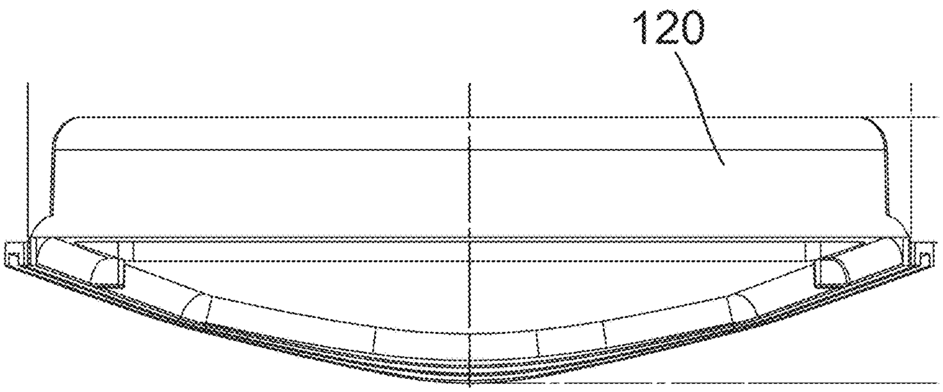
Figure 6C:
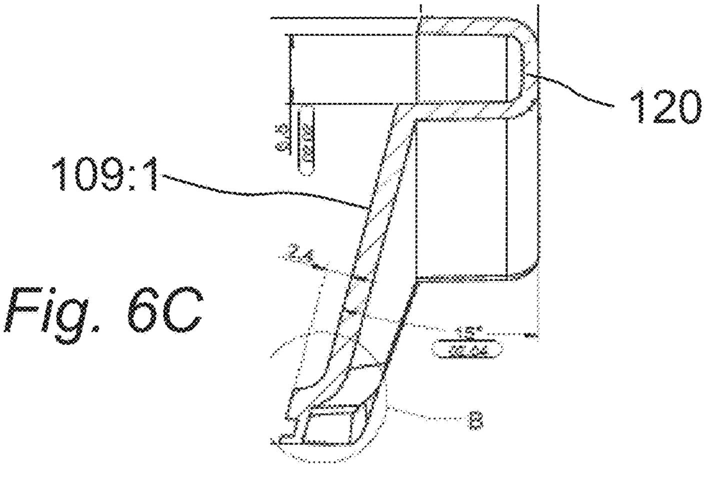

FIGS. 6A, 6B, 6C show further views of the lower part 109 of the smoke deflector 103 analogous to FIGS. 4A, 4B, 4C.

Residual Collector

The floor of the smoke detector cavity may in a preferred embodiment be provided with a residual collector 122, which is partly defined by a front wall 120 of a collector groove 124, for collecting residual debris, including liquid, that may be formed by the chemical process of producing smoke.

The residual collector 122 is preferably arranged as the groove 124 at the floor surface 109:1 of the smoke deflector cavity, close to where it forms the elongated outlet orifice, or even forming the lower portion of that outlet orifice. The residual collector is preferably configured to have a horizontally arched shape to form an integral continuation of the smoke deflector cavity floor surface. It is preferably configured to have a groove gap and groove depth adapted to the amount and speed of debris expected to be formed during smoke generation, such that debris does not fill the entire groove 124, and also such that debris will not overshoot the gap of the groove 124.

The smoke deflector 103, 106, 109 is easily manufactured by e.g. injection moulding or die-casting of an upper part and a lower part which is assembled to form the ready smoke deflector. The structure defining the residual collector groove can easily be formed as an integral part of the lower part by e.g. injection moulding or die-casting.

Figure 7A:
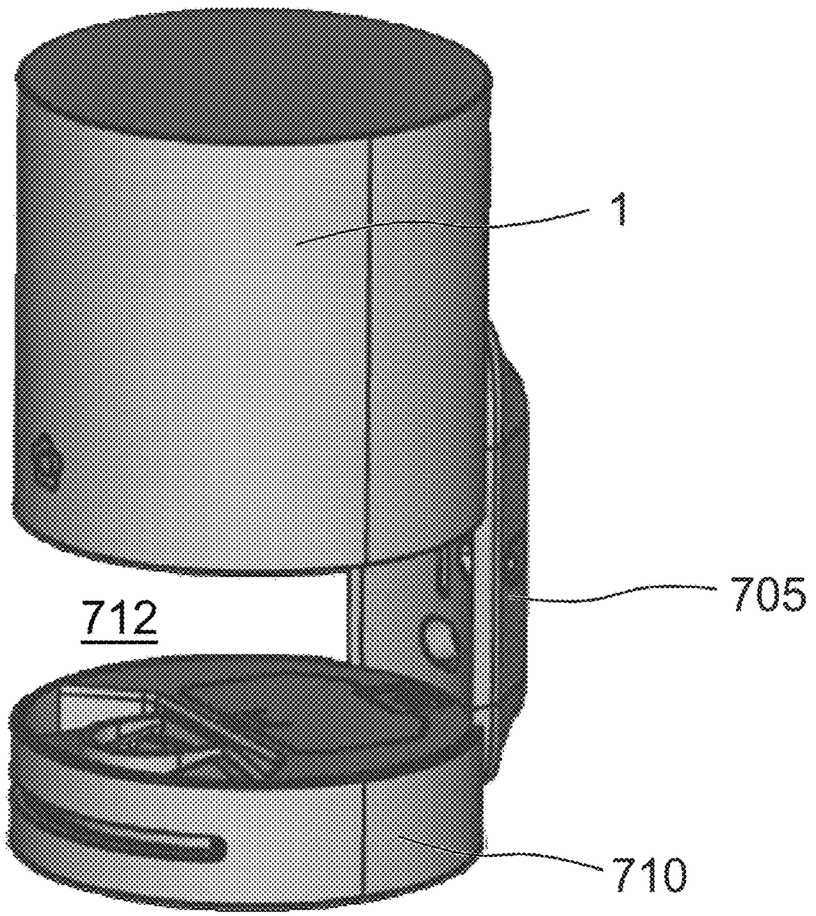
FIG. 7A shows a perspective view of a smoke generator with upper and lower parts slightly separated.
Figure 7B:
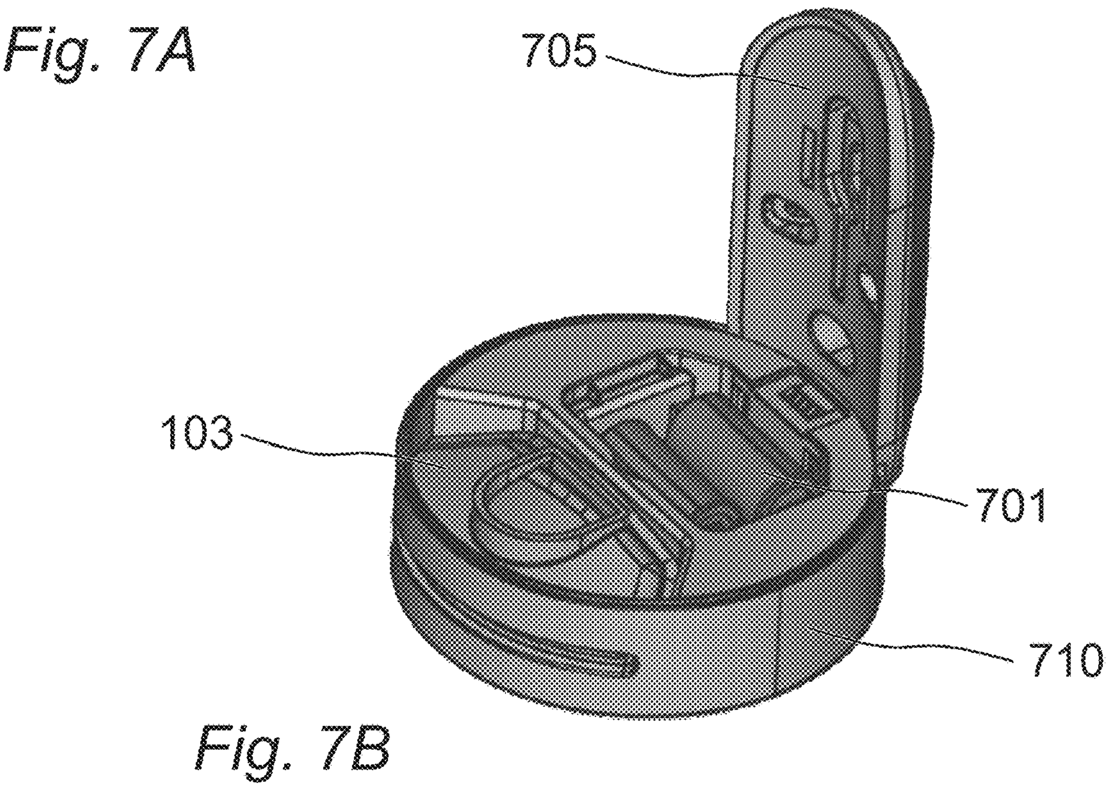
FIG. 7B shows the smoke generator lower part of FIG. 7A.

FIG. 7A shows a perspective view of a smoke generator 100 with upper 1 and lower parts 710 slightly separated (e.g., by a gap 712). Smoke generator upper part 1 and lower part 710 are configured to be attachable to a wall mount 705. FIG. 7B shows the smoke generator lower part 710 of FIG. 7A in more detail. In a front compartment the smoke deflector 103 is arranged, and a battery compartment arranged behind the smoke deflector compartment is configured to house one or more batteries 701.

Figure 8:
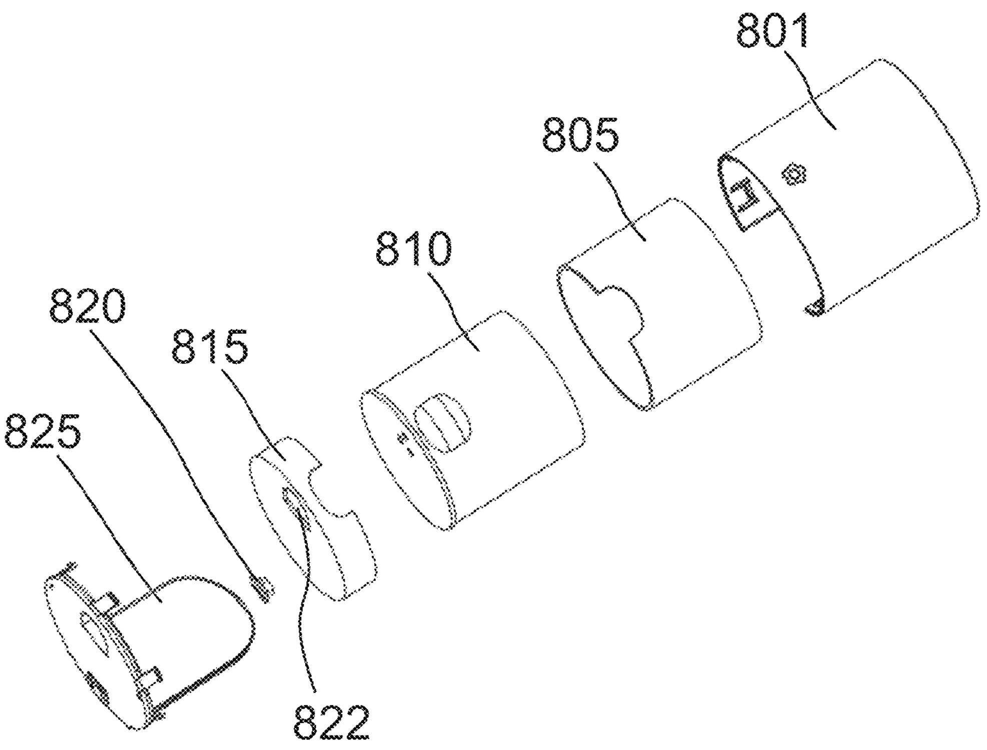
FIG. 8 shows an exploded view of a smoke generator upper part with a pyrotechnical canister.

FIG. 8 shows an exploded view of a smoke generator upper part with a pyrotechnical canister 810. The smoke generator upper part comprise a two-piece canister housing 805, 815 for housing a smoke canister, the canister housing 805, 815 being configured to facilitating ease of replacement of canister housing 805, 815 together with canister as one item, when replacing the canister of a smoke generator. The two-piece canister housing 805, 815 comprises a first canister housing piece 805, and a second canister housing piece 815, and connection means to hold them together. The canister housing 805, 815 is preferably conformal and size adapted with the shape of the smoke canister 810, such that cylindrical canister housings goes together with cylindrical smoke canisters, cuboidal canister housings goes together with cuboidal smoke canisters etc. However, cylindrical shape has shown to give an overall compact smoke generator.

The canister housing may be further provided with an electrical interface 820 for conveying electrical signals from outside the canister housing to the canister residing inside the canister housing, the canister housing also being provided with a smoke flow interface 822 allowing smoke to flow from the canister to the outside of the canister housing. The electrical interface may include that the canister housing is configured to define an orifice which allow contactors to make electrical contact with contact areas of the smoke canister. The smoke flow interface may include that the canister housing is configured to define an orifice arranged to cooperate with a smoke outlet of the smoke canister. The canister housing is preferably made of plastic.

Advantages of the above described configuration is that the chemical component of the device is completely isolated from the electronic part of the device, so once triggered, it is possible change the canister subassembly and maintain the same electronics, which has the advantage of cost of materials, cost of maintenance, no need to reinstall the electronics.

A further advantage of the above described configuration of the smoke generator is that the pyrotechnical component, the canister, is embedded in a plastic housing, so there is no need to manipulate it directly when installing and when replacing the canister after having launched the smoke.

A still further advantage of the above described configuration of the smoke generator is that the smoke canister housing with a canister can be assembled in the device without any tool, making the process of installing it by a non-qualified person, even as a "Do It Yourself" process. It is as easy as changing a battery in a smartphone.

LEGEND

3 Compartment divider frame
4 battery lid
100 Smoke generator
1, 101 Smoke generator upper part
103 Smoke deflector
6, 106 Smoke deflector upper part
106:1 Lower surface of smoke deflector upper part
5, 109 Smoke deflector lower part
109:1 Upper surface of smoke deflector lower part
110 Emission port
112 Inlet
114 Outlet opening
115 Flange
120 Front wall of collector groove
122 Residual collector
124 Collector groove
701 Battery
705 Wall mount
710 Smoke generator lower part
712 Gap
801 Upper casing
805 First canister housing piece
810 Smoke canister
815 Second canister housing piece
820 Electrical interface
822 Smoke flow interface
825 Panel

What is claimed is:

1. A method of introducing smoke into a room with a smoke generator assembly, the method comprising:
activating a pyrotechnic smoke canister to release smoke downwardly along a vertical direction so that the released smoke has a smoke flow that has a generally downward direction of travel; and
redirecting the smoke flow from the generally downward direction of travel so that the smoke flow travels through an emission port of the smoke generator assembly in a distribution direction that is between a horizontal direction and the vertical direction.

2. The method of claim 1, further comprising detecting an unauthorized access to the room and wherein the activating is made in response to the detecting the unauthorized access.

3. The method of claim 1, further comprising conveying an electrical signal from a battery powered electronics unit to an electrical interface of the pyrotechnic smoke canister.

4. The method of claim 1, further comprising, after the activating, removing the pyrotechnic smoke canister from a housing of the smoke generator.

5. The method of claim 1, wherein the distribution direction is closer to the horizontal direction than to the vertical direction.

6. The method of claim 5, wherein the distribution direction is about 75° to 85° from the vertical direction.

7. The method of claim 1, wherein the redirecting includes spreading the smoke flow to have a wider disbursement angle than a disbursement angle of the smoke flow that has the generally downward direction of travel.

8. The method of claim 7, wherein the spreading is in a plane slanting 10° to 15° degrees relative to the horizontal direction.

9. The method of claim 1, wherein the redirecting includes flowing the smoke into a smoke deflector cavity through an inlet so that the smoke interacts with internal walls of the smoke deflector cavity and flowing the smoke out of the smoke deflector cavity through an outlet opening that forms the emission port.

10. The method of claim 9, wherein, prior to flowing into the smoke deflector cavity, the smoke flows through a gap that spaces apart the inlet of the smoke deflector cavity and a smoke flow interface of the pyrotechnic smoke canister through which the smoke is released.

11. The method of claim 1, further comprising collecting residuals emitted from the pyrotechnic smoke canister in a residual collector disposed below the pyrotechnic smoke canister.

12. The method of claim 11, wherein the residuals include liquid.

* * * * *